(12) United States Patent
Sasaki et al.

(10) Patent No.: US 11,573,128 B2
(45) Date of Patent: Feb. 7, 2023

(54) RADIATION TEMPERATURE MEASURING DEVICE

(71) Applicant: ASAHI KASEI KABUSHIKI KAISHA, Tokyo (JP)

(72) Inventors: Hiroyuki Sasaki, Tokyo (JP); Masaru Sugiyama, Tokyo (JP)

(73) Assignee: Asahi Kasel Kabushiki Kaisha, Tokyo (JP)

(*) Notice: Subject to any disclaimer, the term of this patent is extended or adjusted under 35 U.S.C. 154(b) by 645 days.

(21) Appl. No.: 16/467,651

(22) PCT Filed: Dec. 4, 2017

(86) PCT No.: PCT/JP2017/043454
§ 371 (c)(1),
(2) Date: Jun. 7, 2019

(87) PCT Pub. No.: WO2018/105551
PCT Pub. Date: Jun. 14, 2018

(65) Prior Publication Data
US 2020/0080897 A1 Mar. 12, 2020

(30) Foreign Application Priority Data
Dec. 7, 2016 (JP) .............. JP2016-237745

(51) Int. Cl.
*G01J 5/59* (2022.01)
*G01J 5/06* (2022.01)
(Continued)

(52) U.S. Cl.
CPC . *G01J 5/59* (2022.01); *G01J 5/06* (2013.01); *G01J 5/10* (2013.01); *G02B 5/3058* (2013.01); *G01J 5/48* (2013.01); *G01J 2005/604* (2013.01)

(58) Field of Classification Search
CPC ........ G01J 5/59; G01J 5/06; G01J 5/10; G01J 5/48; G01J 2005/604; G01J 5/0825; G01J 2005/0081; G02B 5/3058
See application file for complete search history.

(56) References Cited

U.S. PATENT DOCUMENTS

| 4,257,106 A | 3/1981 | Auer |
| 5,436,443 A * | 7/1995 | Abtahi ............ G01J 5/58 250/225 |

(Continued)

FOREIGN PATENT DOCUMENTS

| CN | 104390148 A | 3/2015 |
| JP | S57-064130 A | 4/1982 |

(Continued)

OTHER PUBLICATIONS

International Preliminary Report on Patentability dated Jun. 11, 2019, for the corresponding International Application No. PCT/JP2017/043454.

(Continued)

*Primary Examiner* — David P Porta
*Assistant Examiner* — Fani Polyzos Boosalis
(74) *Attorney, Agent, or Firm* — Morgan, Lewis & Bockius LLP

(57) ABSTRACT

An object of the present invention is to provide a radiation temperature measuring device capable of preventing reduction in the accuracy of temperature measurement due to an electromagnetic wave reflected by a measurement target. A radiation temperature measuring device includes a reflective polarizing plate configured to reflect a polarized wave of one direction in an electromagnetic wave radiated from an object to be measured and transmit or absorb a polarized wave of a direction perpendicular to the one direction and an infrared sensor configured to detect the polarized electromagnetic (Continued)

wave of the one direction reflected by the reflective polarizing plate.

9 Claims, 5 Drawing Sheets

(51) Int. Cl.
  *G01J 5/10* (2006.01)
  *G02B 5/30* (2006.01)
  *G01J 5/60* (2006.01)
  *G01J 5/48* (2022.01)

(56) References Cited

U.S. PATENT DOCUMENTS

| | | |
|---|---|---|
| 6,174,080 B1 | 1/2001 | Jennings |
| 2006/0255017 A1* | 11/2006 | Markle ............ G01K 11/125 374/E11.019 |
| 2007/0009010 A1 | 1/2007 | Shio et al. |
| 2012/0206805 A1* | 8/2012 | Meng ............... G02B 5/008 359/487.03 |
| 2015/0136945 A1 | 5/2015 | Babic et al. |
| 2019/0049310 A1* | 2/2019 | Osamu ............ G01J 5/061 |

FOREIGN PATENT DOCUMENTS

| | | |
|---|---|---|
| JP | S57-161625 A | 10/1982 |
| JP | S60-049850 B2 | 11/1985 |
| JP | S61-012212 B2 | 4/1986 |
| JP | S62-266424 A | 11/1987 |
| JP | H05-273045 A | 10/1993 |
| JP | 2007-256219 A | 10/2007 |
| JP | 2008-541133 A | 11/2008 |
| JP | 2011-007730 A | 1/2011 |
| JP | 2014-044244 A | 3/2014 |
| JP | 2014-134630 A | 7/2014 |
| JP | 2016-038537 A | 3/2016 |
| JP | 6019508 B1 | 10/2016 |

OTHER PUBLICATIONS

Yamada et al., "Modeling, fabrication, and characterization of tungsten silicide wire-grid polarizer in infrared region," Applied Optics, 47 (26): 4735-4738 (2008).

Supplementary European Search Report issued in corresponding European Patent Application No. 17879403.8 dated Nov. 4, 2019.

Tamura et al., "Development of 5.5 to 7.9 um Thermography Device and Application Thereof", Journal of the Japan Society of Infrared Science and Technology, Dec. 1998, vol. 8, No. 2, pp. 99-107 (with partial translation).

International Search Report dated Feb. 27, 2018, issued in corresponding International Patent Application No. PCT/JP2017/043454.

* cited by examiner

RADIATION TEMPERATURE MEASURING DEVICE

TECHNICAL FIELD

The present invention relates to a radiation temperature measuring device using an infrared sensor.

BACKGROUND ART

Conventionally, there are known temperature measuring devices that contactlessly measure the temperature of a target by using an infrared sensor. Examples of applied products of the devices include radiation thermometers (contactless thermometers) and thermography (infrared cameras). Such temperature measuring devices utilize a principle that electromagnetic wave energy radiated from a target is determined only by the temperature of the target. In other words, using an infrared sensor enables measurement of the radiated energy in an infrared wavelength band that occupies a major part of the electromagnetic wave energy radiated from the target. The temperature of the target is calculated from a measured value of the radiated energy. The calculation of the temperature of the target uses, for example, Stefan-Boltzmann's Law of black body radiation or the like.

Technically, however, calculation using black body radiation is applicable only to objects with an emissivity of 1 (100%). Among actual targets, there is no object with the emissivity of 1, and reflectance is always non-zero. In the examples of the applied products such as radiation thermometers, correction, which is generally called emissivity correction, is performed to correct reflection on a target. To specifically explain the emissivity correction by using numerical values, when an object has a reflectance of 5%, its emissivity is 95%. Then, only 95% of electromagnetic wave energy is measured, although originally 100% thereof should be measurable. Thus, correction is made by multiplying by a reciprocal of the ratio.

A problem still remains in this method. The problem is that since the reflectance of an actual target is not zero, an electromagnetic wave reflected by a surface of the target reaches the infrared sensor and the applied product. Naturally, a reflected component of the electromagnetic wave is also involved in measurement by the infrared sensor, as a result of which a measured portion based on the reflected component appears as an error. In other words, the above-described emissivity correction can be used only under conditions where there is no (zero) original light source reflected by an object.

CITATION LIST

Patent Literature

PTL 1: JP 2014-134630 A
PTL 2: JP 2011-7730 A

Non Patent Literature

NPL 1: Tetsuo Tamura & two others, 5.5-7.9 μm. Infrared Imager and Application, Journal of the Japan Society of Infrared Science and Technology, edited by the Japan Society of Infrared Science and Technology, December 1998, Vol. 8, No. 2, pp. 99-107.

SUMMARY OF INVENTION

Technical Problem

NPL 1 discloses a technology for solving the problem of reflection that occurs when measuring the temperature of a target, as described above. According to NPL 1, glass, tile, and the like including silicon oxide ($SiO_2$) as a main surface component have very high reflectance at wavelengths of about from 8 to 15 μm. NPL 1 states that the reflectance is up to about 30%. NPL 1 states that, to solve the problem of the reflectance, infrared rays at wavelengths of about from 5 to 8 μm, where reflectance is small, are detected without detecting those at wavelengths of from 8 to 15 μm, which are measurement wavelengths for ordinary radiation thermometers and thermography.

However, for example, the reflectance of glass to infrared rays at wavelengths of from 5 to 8 μm is from 3 to 4% on average. Accordingly, even with the use of the technology disclosed in NPL 1, the influence of reflection can only be reduced to some extent, but not to zero. In other words, a reflected component of an electromagnetic wave has influence on measurement by an infrared sensor.

On the other hand, polarizing plates are well known as products for preventing reflection of electromagnetic waves on such interfaces. The most known way of using a polarizing plate is polarized sunglasses, which can reduce reflected light generated on a water surface near fish targeted by a fishing person. As can be seen in this example, a polarizing plate is most frequently used in a visible light wavelength band (wavelengths of about from 400 to 800 nm) of electromagnetic waves, and additionally is often applied also in a near infrared band (wavelengths of about from 800 nm to 1.5 μm).

PTL 1 discloses one specific method for using a polarizing plate. Unpolarized ordinary light (near-infrared light in PTL 1) directed to a polarizing plate (a wire grid polarizing film having a fixed polarization axis in PTL 1) is transmitted in an intrinsic axial direction of the polarizing plate, and reflected in a direction orthogonal to the axial direction. Electromagnetic wave energies of both the polarized transmitted light component and the polarized reflected light component are measured by a light receiving unit. However, the device disclosed in PTL 1 is not a temperature measuring device.

PTL 2 discloses a temperature measuring device using a polarizing plate. However, the device is a technology in which during physical vibration of an object to be measured, the temperature of the object to be measured is obtained by measuring each of two polarized components by using a polarizing plate to minimize influence of the vibration. PTL 2 provides neither any description nor any suggestion about reflectance of the object to be measured (measurement target) and reflection phenomenon itself.

Furthermore, the following is a problem not described in PTL 1 and PTL 2. The problem is that, in general, it is very difficult to form an ordinary polarizing plate in such a manner as to transmit all electromagnetic waves having wavelengths of about from 5 to 15 μm in the infrared band. For example, dye-based polarizing plates often used in liquid crystal displays (LCDs) transmit only electromagnetic waves in the visible light band, so that no electromagnetic waves in the infrared band are transmitted, and all absorbed by the polarizing plates.

In addition, the above-described wire grid polarizing film is a polymer film. Thus, in infrared bands in the vicinity of the wavelengths, an absorption mode of a material substrate appears, whereby transmittance becomes very low, and there is even a wavelength band with a transmittance of 0. Accordingly, since the transmittance is very low, a measured output of transmitted polarized light becomes very low. In other words, it is difficult to measure a transmissive electromagnetic wave, which is the same as that of the polarized sunglasses described above, at least in an infrared band such that radiation temperature is measured.

It is an object of the present invention to provide a radiation temperature measuring device capable of detecting at a sufficiently high level of output even in an infrared wavelength band optimum for measuring radiation temperature and capable of preventing reduction in accuracy of temperature measurement even when reflectance of a measurement target is high.

Solution to Problem

In order to achieve the object mentioned above, according to an aspect of the present invention, there is provided a radiation temperature measuring device configured to contactlessly measure a surface temperature of an object by using an infrared sensor, the radiation temperature measuring device including: the infrared sensor configured to detect an electromagnetic wave radiated from the object; and a polarizing plate configured to reflect a polarized wave of one direction in the electromagnetic wave and transmit or absorb a polarized wave of a direction perpendicular to the one direction, wherein the infrared sensor detects the polarized wave of the one direction reflected by the polarizing plate.

Advantageous Effects of Invention

According to an aspect of the present invention, it is possible to detect at a sufficiently high level of output even in an infrared wavelength band optimum for measuring radiation temperature and to prevent reduction in accuracy of temperature measurement even when reflectance of a measurement target is high.

DESCRIPTION OF EMBODIMENTS

Hereinafter, one embodiment of the present invention will be described with reference to FIG. 1 to FIG. 10.

(Structure of Radiation Temperature Measuring Device)

Figure 1:
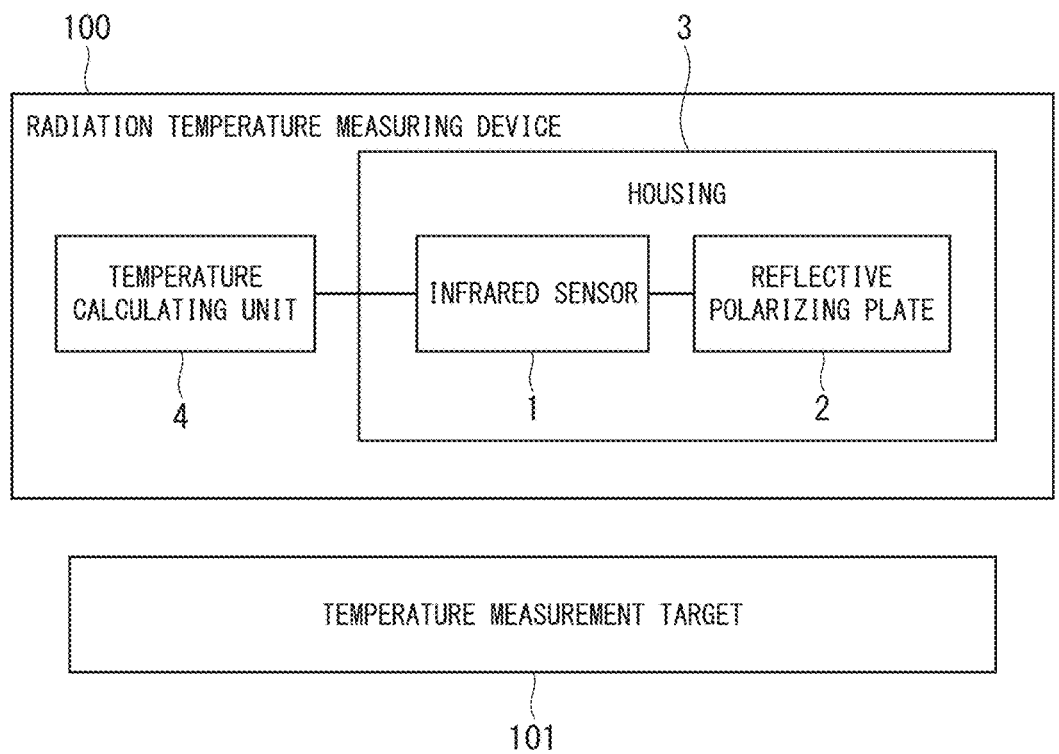
FIG. 1 is a block diagram illustrating a structural example of a radiation temperature measuring device 100 according to one embodiment of the present invention.

FIG. 1 is a block diagram illustrating a schematic structural example of a radiation temperature measuring device 100 according to the present embodiment. The radiation temperature measuring device 100 is a device configured to contactlessly measure a surface temperature of an object that is a measurement target by using an infrared sensor.

The infrared sensor is denoted by "1". In the present invention, as will be described later, preferably, the wavelength band of the infrared sensor is not a conventional far infrared band (from 8 to 15 μm), but a middle infrared band (from 4 to 8 μm).

A reflective polarizing plate 2 is a reflection type polarizing plate. A reflective polarizing plate refers to a polarizing plate having a function of reflecting one component of an electromagnetic wave. An ordinary polarizing plate has a transmitting or absorbing function to split into polarized electromagnetic waves, but does not necessarily have a reflecting function. One example of those having no reflecting function is an iodine type polarizing plate, which is often used in liquid crystal displays. On the other hand, examples of those having the reflecting function include a wire grid polarizing film (hereinafter abbreviated to "WGF") and a laminated type polarizing film.

The radiation temperature measuring device 100 includes a housing 3 in which the infrared sensor 1 and the reflective polarizing plate 2 are integrated. The housing 3 mainly plays a first role of combining the infrared sensor 1 with the reflective polarizing plate 2 in a prescribed size and a second role of suppressing disturbance (stray light) entering the infrared sensor 1 by an infrared absorption function of the housing 3.

The radiation temperature measuring device 100 further includes a temperature converting unit 4 configured to convert a detection signal of the infrared sensor 1 into temperature. The temperature converting unit 4 may be provided outside the housing 3, as illustrated in FIG. 1, or provided inside the housing 3.

A temperature measurement target 101 is a temperature measurement target whose temperature is to be measured by the radiation temperature measuring device 100, and is arranged at a place different from where the radiation temperature measuring device 100 is arranged. In addition, basically, the temperature measurement target 101 may be any object, and, for example, may be a black body. The radiation temperature measuring device 100 according to the present embodiment exhibits more effectiveness if the temperature measurement target 101 is an object having a higher reflectance, such as glass.

Figure 2:
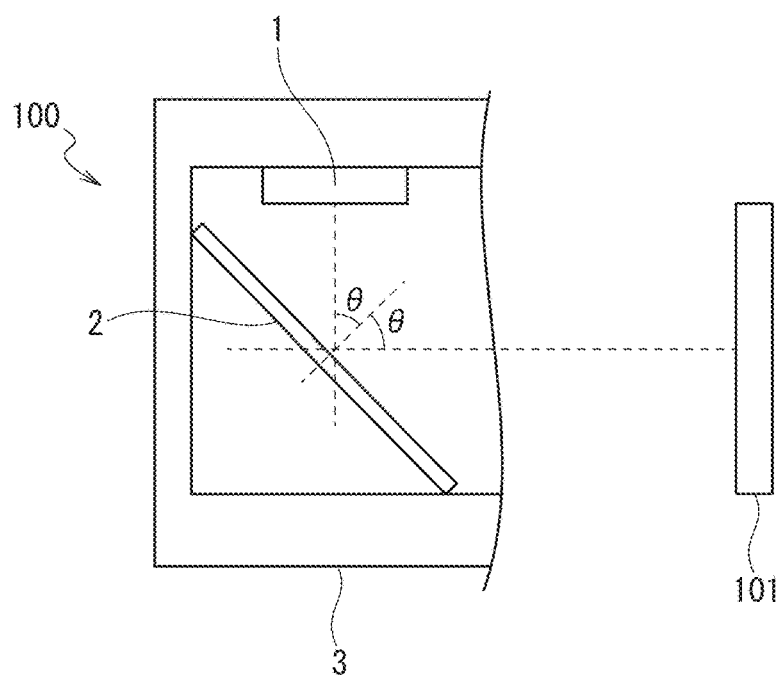
FIG. 2 is a schematic diagram illustrating an arrangement example of constituent elements of the radiation temperature measuring device 100 according to the one embodiment of the present invention.

FIG. 2 is a diagram schematically illustrating an actual arrangement relationship among the infrared sensor 1, the reflective polarizing plate 2, the housing 3, and the temperature measurement target 101. FIG. 2 schematically illustrates cross sections of the infrared sensor 1, the reflective polarizing plate 2, the housing 3, and the temperature measurement target 101. The infrared sensor 1 and the reflective polarizing plate 2 are attached to the housing 3 by making an angle of θ between each other (θ=45 degrees in the present example). Additionally, the temperature measurement target 101 is arranged in a direction making an angle of θ (θ=45 degrees in the present example) with respect to the reflective polarizing plate 2. An electromagnetic wave to be measured by the infrared sensor 1 is input from the direction where the temperature measurement target 101 is arranged. The infrared sensor 1, the reflective polarizing plate 2, and the housing 3 illustrated in FIG. 2 are hardware portions of the radiation temperature measuring device 100. On the other hand, the temperature converting unit 4 unillustrated in FIG. 2 is realized by software incorporated in the radiation temperature measuring device 100.

FIG. 2 illustrates an example in which the angle θ made by the infrared sensor 1 and the reflective polarizing plate 2 is 45 degrees, and the angle θ made by the reflective polarizing plate 2 and the temperature measurement target 101 is 45 degrees. However, from the viewpoint of the necessity to measure a reflected electromagnetic wave, the angles made by the constituent elements can be any angle, in principle, as long as the angles are neither angles close to zero degrees nor angles close to 90 degrees. Details thereof will be described below.

Figure 3:
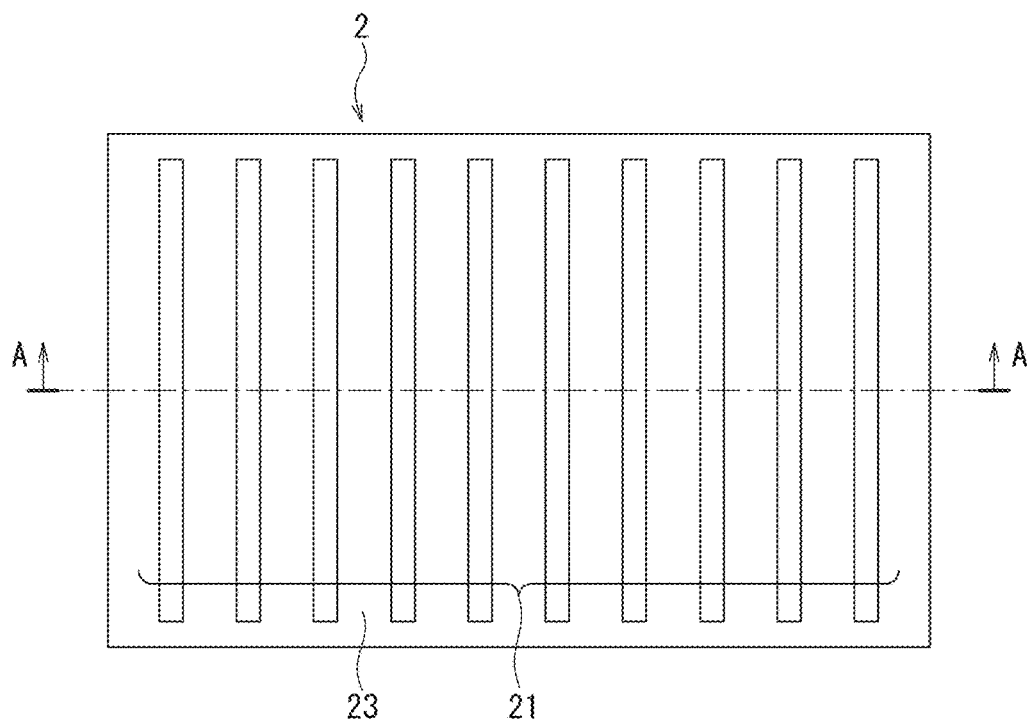
FIG. 3 is a schematic diagram of a polarizing film (WGF) associated with a reflective polarizing plate 2, which is included in the radiation temperature measuring device 100 according to the one embodiment of the present invention.
Figure 4:
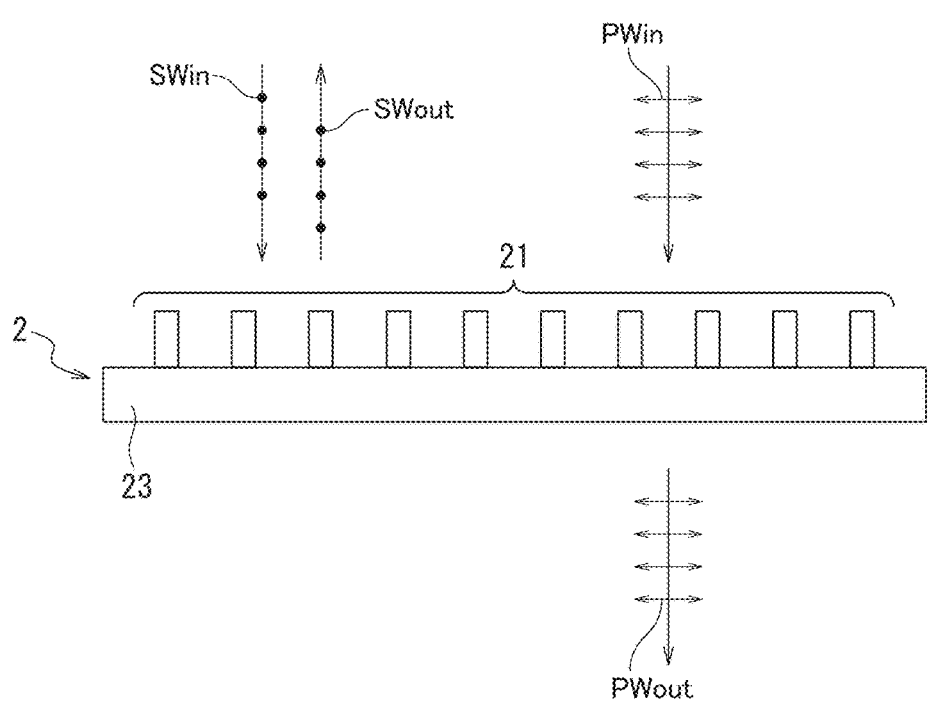
FIG. 4 is a diagram for describing the radiation temperature measuring device 100 according to the one embodiment of the present invention, which is a schematic diagram of a section of the reflective polarizing plate 2 taken along line A-A indicated in FIG. 2.

Next, details of the reflective polarizing plate 2 will be described with reference to FIG. 3 and FIG. 4. FIG. 4 illustrates a cut section of the reflective polarizing plate 2 taken along line A-A indicated in FIG. 3.

One specific example of the reflective polarizing plate 2 is WGF. As illustrated in FIG. 3, in the reflective polarizing plate 2, there are formed a film surface 23 and grids 21 (thin lines of aluminum) placed side by side in one direction, as in FIG. 3, (placed side by side longitudinally in FIG. 3) when viewed from a direction perpendicular to the film surface 23.

As illustrated in FIG. 4, upon incidence of a parallel polarized electromagnetic wave SWin (seethe left side in FIG. 4) parallel to the direction of the grids 21 and a perpendicular polarized electromagnetic wave PWin (see the right side in FIG. 4) of a direction perpendicular to the direction of the grids 21 to the reflective polarizing plate 2, a parallel polarized electromagnetic wave SWout is reflected as in the drawing if the parallel polarized electromagnetic wave SWin enters the reflective polarizing plate 2 from the grid 21 side, as illustrated on the left side in FIG. 4. On the other hand, as illustrated on the right side in FIG. 4, if the perpendicular polarized electromagnetic wave PWin enters the reflective polarizing plate 2 from the grid 21 side, a perpendicular polarized electromagnetic wave PWout is transmitted therethrough, typically as in the drawing.

Figure 5:
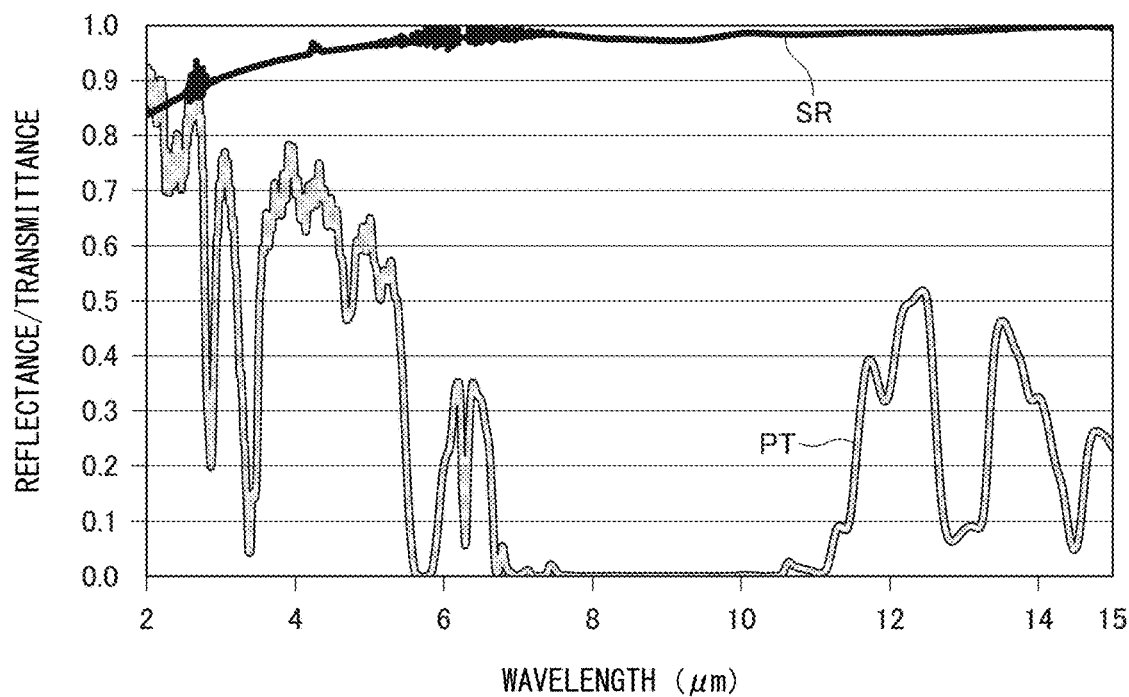
FIG. 5 is a diagram for describing the radiation temperature measuring device 100 according to the one embodiment of the present invention, which is a graph depicting reflectance of parallel polarized electromagnetic waves and transmittance of perpendicular polarized electromagnetic waves, respectively, on the reflective polarizing plate 2.

However, an actual perpendicular polarized electromagnetic wave includes not only a component to be transmitted as illustrated in FIG. 4, but also a component to be absorbed by the film surface 23 of the reflective polarizing plate 2. FIG. 5 illustrates a specific numerical example thereof.

FIG. 5 is a graph obtained by measuring reflectance of perpendicular polarized electromagnetic waves and transmittance of parallel polarized electromagnetic waves on the reflective polarizing plate 2 in an infrared band ranging from a near infrared band of 2 μm to a far infrared band of 15 μm. In FIG. 5, the horizontal axis represents wavelengths (μm) of the electromagnetic waves. On the other hand, PT of the vertical axis represents transmittance characteristics of the perpendicular polarized electromagnetic waves, and SR of the vertical axis represents reflectance characteristics of the parallel polarized electromagnetic waves.

As illustrated in FIG. 5, numerical values of the characteristics PT indicate a transmittance close to 0.9 (90%) in the near infrared band close to visible light. This means that the reflective polarizing plate 2 has an absorptivity of approximately 10% with respect to an electromagnetic wave in the near-infrared band. More precisely, the sum of the absorptivity and reflectance of the reflective polarizing plate 2 results in approximately 10%.

However, as indicated by the characteristics PT in FIG. 5, the transmittance of the perpendicular polarized electromagnetic waves on the reflective polarizing plate 2 gradually decreases to, for example, 60% at a wavelength of around 5 μm, and 30% at 6 μm, resulting in zero at 7 μm. In other words, when using WGF or a polarizing plate in a transmission detection type, since the transmittance is as high as approximately 90% in the band of wavelengths shorter than the near infrared band, electromagnetic wave signal intensity does not decrease. However, the transmittance decreases in the middle infrared band (from 4 to 8 μm) or the far infrared band (from 8 to 15 μm), so that the electromagnetic wave signal intensity significantly decreases. Measurement bands of a radiation thermometer using an infrared sensor are the middle infrared band and the far infrared band. If actual integral calculation is performed, radiation temperature measurement by using WGF in the transmission detection type indicates a reduction to approximately ¼ of a signal component to be originally obtainable.

On the other hand, as indicated by characteristics SR in FIG. 5, the reflectance of the reflective polarizing plate 2 with respect to the parallel polarized electromagnetic waves has values substantially close to 1 (such as, for example, 98%) in both the middle infrared band and the far infrared band. The reason that the reflectance of the reflective polarizing plate 2 with respect to the parallel polarized electromagnetic waves has values close to 100% is that the reflectance of aluminum has a value close to 1 in a wavelength band of from 4 to 15 μm. If a reflection detection type temperature measurement is possible, a signal to be originally obtained in the transmission detection type is obtained substantially as it is. Actually, a structure capable of performing the reflection detection type temperature measurement corresponds to the radiation temperature measuring device 100 illustrated in FIG. 1, and the arrangement of a specific device including the constituent elements of the radiation temperature measuring device 100 corresponds to the arrangement illustrated in FIG. 2.

Next will be a description of advantages of using a polarizing film typified by WGF as the reflective polarizing plate 2, in which the advantages will be described by dividing into two points.

First, a first advantage is that polarizing films (including WGF) have an intrinsic rotation axis such that the direction of a reflected polarized wave does not change even when the film is rotated. While FIG. 2 illustrates the example where the infrared sensor 1 and the reflective polarizing plate 2 make the angle of 45 degrees, the existence of the intrinsic rotation axis allows reflection detection type temperature measurement to be performed even at an angle other than 45 degrees, as described above. For example, the reflectance of aluminum shaped into a grid with respect to a parallel polarized electromagnetic wave is hardly dependent on angle of reflection, similarly to ordinary flat films of aluminum (so-called solid films). Thus, a signal component input to the infrared sensor 1 does not vary even at any reflection angle of 45 degrees, 10 degrees, or 80 degrees with respect to the reflective polarizing plate 2. This indicates that it suffices to measure a polarized wave component including no reflection on a radiation temperature measurement target by reflection of the parallel polarized electromagnetic wave by the infrared sensor 1.

Even if glass itself is used in place of a polarizing film such as WGF, it is not impossible to perform temperature measurement by reflection, as in the present embodiment. However, reflectance of an S wave of glass is much lower than the reflectance of a parallel polarized electromagnetic wave of WGF, and is, for example, approximately 1/10. Thus, a signal component input to the infrared sensor is significantly reduced.

A second advantage is that by optimally selecting the rotation angle of the polarizing film, the reflectance of a polarized electromagnetic wave perpendicular to the parallel polarized electromagnetic wave can be suppressed to be significantly small. The reflectance of the parallel polarized electromagnetic wave is preferably high, since it is a signal relating to measurement. A specific method may be as follows.

Figure 6:
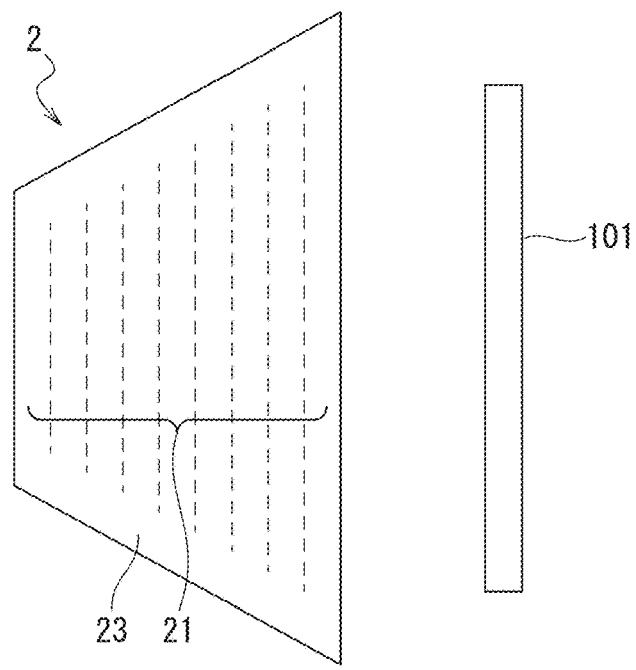
FIG. 6 is a diagram for describing the radiation temperature measuring device 100 according to the one embodiment of the present invention, which is a schematic diagram depicting an optimal arrangement example of only the reflective polarizing plate 2.

FIG. 6 is a diagram more specifically illustrating the arrangement relationship between the reflective polarizing plate 2 and the temperature measurement target 101 illustrated in FIG. 2. FIG. 6 illustrates a positional relationship between a direction of the film surface 23 and the grids 21 of the reflective polarizing plate 2 and the temperature measurement target 101 when viewed from a lower direction of a paper surface in FIG. 2. Additionally, the reflective polarizing plate 2 illustrated in FIG. 6 is presented as a schematic diagram where the WGF of FIG. 3 is first viewed from a back side of the paper surface, and then rotated by 45 degrees clockwise from an upper direction on the paper surface in FIG. 6.

In this case, the magnitude of a signal component based on a reflectance of the reflective polarizing plate 2 with respect to a parallel polarized electromagnetic wave is as described as the foregoing first advantage. On the other hand, when considering the reflectance of the reflective polarizing plate 2 with respect to a perpendicular polarized electromagnetic wave, only a reflected component of the perpendicular polarized electromagnetic wave that is attributable to a refractive index of a film base material of the WGF, i.e., of the film surface 23 thereof is measured as a signal component detected by the infrared sensor 1. In general, a film base material used in WGF or polarizing films having an intrinsic polarization axis is a polymer film. The polymer film has a refractive index of approximately 1.5. Accordingly, by selecting, as a rotation angle, a Brewster angle (approximately 56 degrees) based on the refractive index of the polymer film, the signal component based on the reflectance of the perpendicular polarized electromagnetic wave of the reflective polarizing plate 2 ideally becomes zero. Actually, even when the rotation angle (i.e., the angle θ illustrated in FIG. 2) of the reflective polarizing plate 2 is set to 45 degrees close to 56 degrees, substantially the same effects can be obtained. Thus, the reflection angle of the polarizing film, i.e., of the reflective polarizing plate 2 is preferably set such that the reflectance in the perpendicular direction of the reflective polarizing plate 2 is a minimum.

Figure 7:
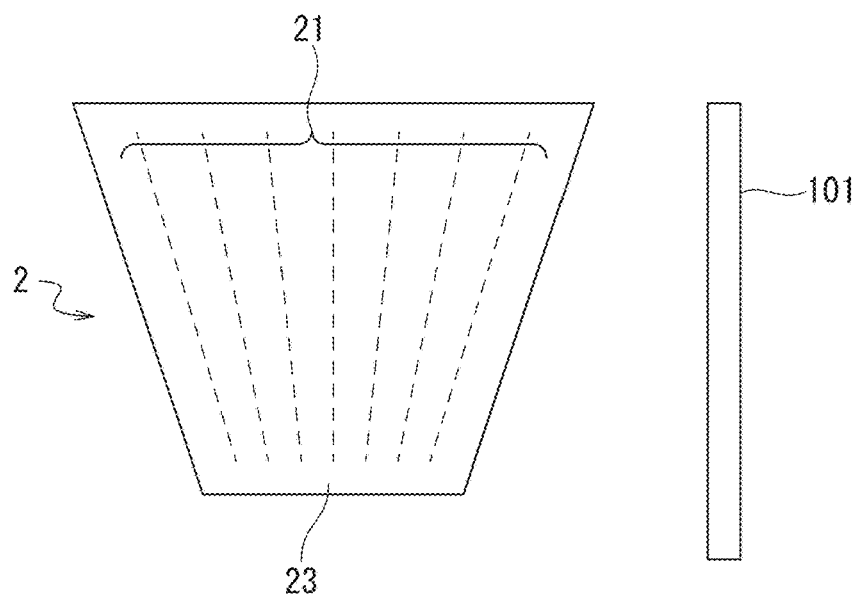
FIG. 7 is a diagram for describing the radiation temperature measuring device 100 according to the one embodiment of the present invention, which is a schematic diagram depicting a non-optimal arrangement example of the reflective polarizing plate 2 in comparison with the arrangement example depicted in FIG. 6.

On the other hand, as illustrated in FIG. 7, it is, however, also possible to rotate the reflective polarizing plate 2 in a direction different from the rotation as in FIG. 6. FIG. 7 depicts a specific example thereof, in which the WGF of FIG. 3 is first viewed from the back side, and then rotated by 45 degrees clockwise from a left direction on the paper surface in FIG. 7. In this case, regardless of any Brewster angle or the like, when the refractive index of the film surface 23 is assumed to be 1.5, the reflectance of the reflective polarizing plate 2 results in 4% at minimum with respect to a perpendicular polarized electromagnetic wave, and the reflectance increases as the rotation angle becomes larger. Accordingly, the signal component of the perpendicular polarized electromagnetic wave, in addition to that of the parallel polarized electromagnetic wave, also becomes large. Due to this, the state of the reflective polarizing plate 2 rotated in the direction illustrated in FIG. 7 would be rather unsuitable for temperature measurement by the radiation temperature measuring device 100 according to the present embodiment.

Next, a description will be given of a state and effects in using glass as a specific example of the temperature measurement target of the present invention.

Figure 8:
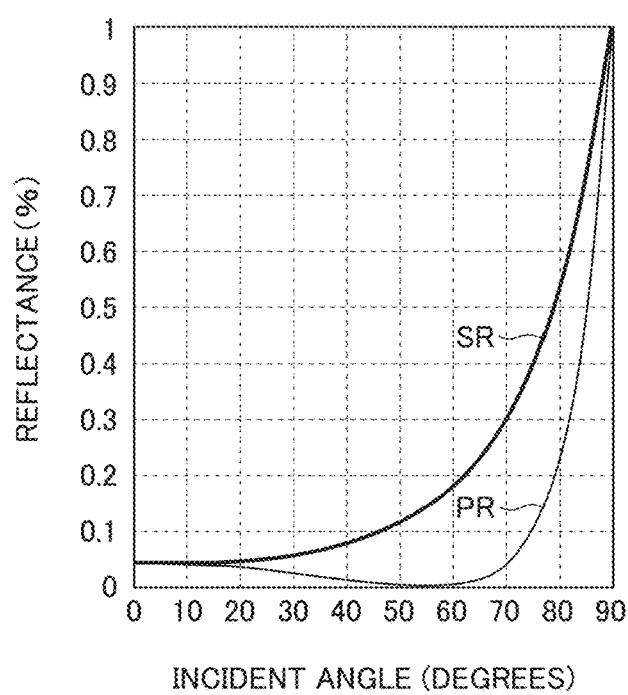
FIG. 8 is a diagram for describing the radiation temperature measuring device 100 according to the one embodiment of the present invention, which is a graph depicting incident angle dependence of reflectance of glass (or an object having a refractive index of 1.5)

The reflectance of glass is approximately 1.5, which is substantially the same as that of the base material film of WGF or the like. A reflectance obtained when an electromagnetic wave having an incident angle of from 0 to 90 degrees enters the glass is well known. FIG. 8 is a graph illustrating reflectance of an electromagnetic wave input to glass at an incident angle of from 0 to 90 degrees. In FIG. 8, the horizontal axis represents incident angle (degrees), and the vertical axis represents reflectance. The unit of reflectance is standardized by a maximum value (100%). Characteristics SR represent reflectance characteristics with respect to the S wave of the glass, and characteristics PR represent reflectance characteristics with respect to a P wave of glass.

As indicated by the characteristics PR in FIG. 8, the reflectance of the P wave of the glass decreases from approximately 4% (0.04) obtained upon perpendicular incidence (an incident angle of 0 degrees), and ideally becomes zero at a Brewster angle (approximately 56 degrees). By contrast, as indicated by the characteristics SR in FIG. 8, the reflectance of the S wave of the glass monotonically increases from 4% in the perpendicular direction. Accordingly, the P wave of the glass is acquired as a parallel polarized electromagnetic wave, and the infrared sensor 1 measures the P wave of the glass as a signal component. On the other hand, the S wave of the glass has a large reflected component due to the glass, and therefore is removed as a perpendicular polarized electromagnetic wave. In this manner, it is possible to perform temperature measurement in which reflection on the glass is removed. This principle is not limited to glass and is applicable to every case for measuring the surface temperature of an object (for example, including a water surface or the like) having reflection mainly due to refractive index.

Figure 9:
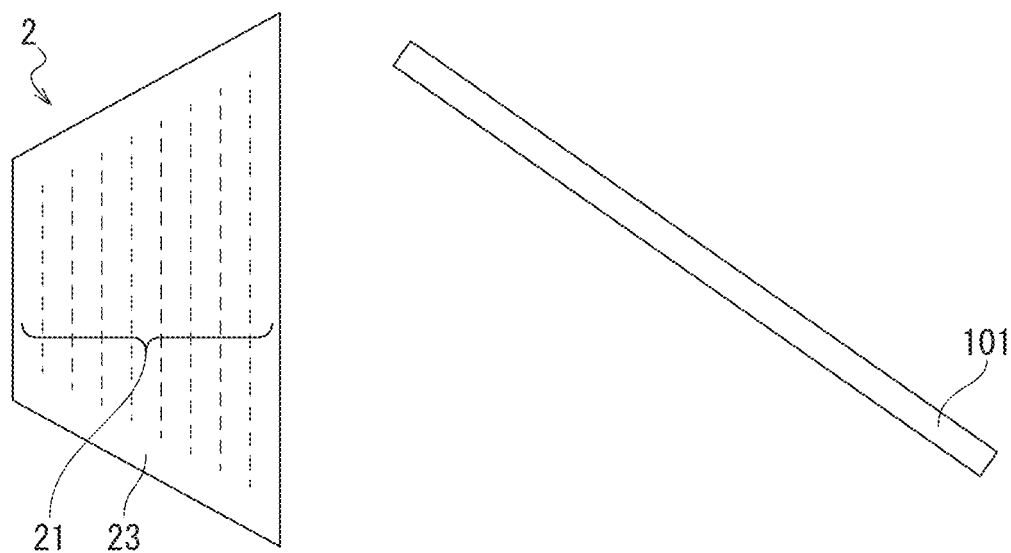
FIG. 9 is a diagram for describing the radiation temperature measuring device 100 according to the one embodiment of the present invention, which is a graph depicting an optimal arrangement example of the reflective polarizing plate 2 and a temperature measurement target 101.

FIG. 9 illustrates a specific arrangement example of the reflective polarizing plate 2 and the temperature measurement target 101 based on the consideration described above. The arrangement example illustrated in FIG. 9 depicts a state where the temperature measurement target 101 (glass) illustrated in FIG. 6 is rotated counterclockwise with respect to a direction perpendicular to the paper surface. In the case where the temperature measurement target 101 is glass, the effect of removing glass reflection is highest when the rotation angle of the temperature measurement target 101 is 56 degrees, which is the Brewster angle. When a temperature measurement target other than glass is, for example, a water surface, the rotation angle is 53 degrees. Usually, it is impossible to rotate a water surface. Thus, in this case, the radiation temperature measuring device 100 may be rotated relative to the water surface. In this manner, the temperature measurement target 101 is arranged to be inclined to the reflective polarizing plate 2. Thus, when the surface of the temperature measurement target 101 is a flat surface, as in glass and water surface, a detection direction by the infrared sensor 1 and the reflective polarizing plate 2 is different from a normal direction of the flat surface. In other words, the detection direction by the infrared sensor 1 and the reflective polarizing plate 2 is a direction of the temperature measurement target 101.

Finally, a description will be given of a method for setting a detection wavelength band of the infrared sensor 1 when glass is the temperature measurement target 101.

Figure 10:
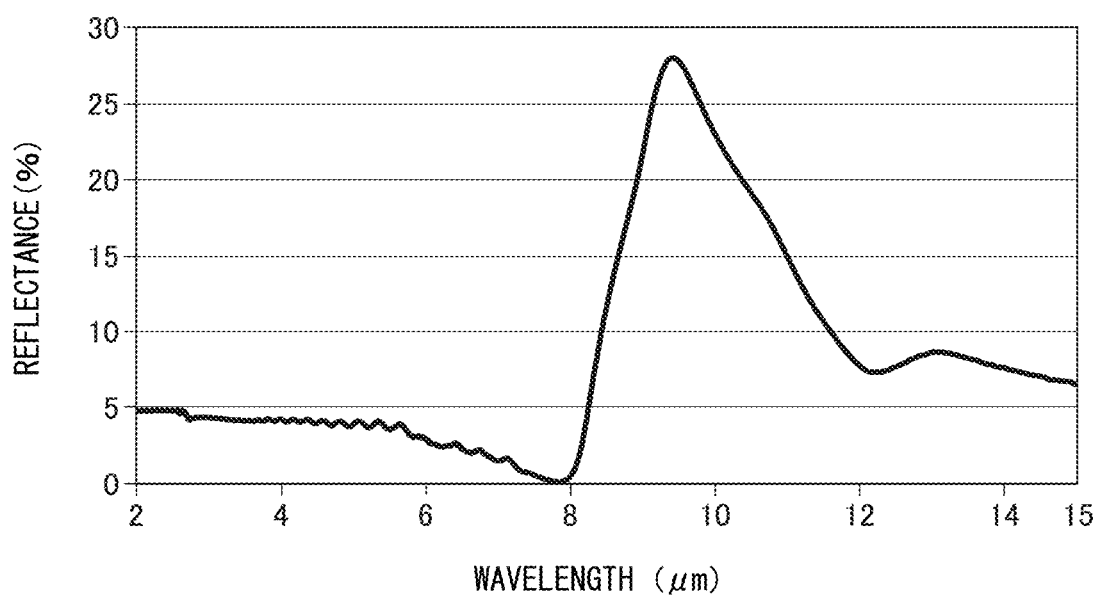
FIG. 10 is a diagram for describing the radiation temperature measuring device 100 according to the one embodiment of the present invention, which is a graph depicting wavelength dependence of reflectance of glass.

The visible light reflectance of glass is as mentioned above. However, even if the incident angle is fixed at near 0 degrees, the reflectance significantly varies from the numerical value of visible light in middle and far infrared bands of 4 μm or more. FIG. 10 is a diagram illustrating measurement results of the reflectance of glass with respect to electromagnetic waves in the middle and far infrared bands. In FIG. 10, the horizontal axis represents wavelength (μm) of the electromagnetic waves, and the vertical axis represents reflectance (%).

As illustrated in FIG. 10, the reflectance of the glass with respect to the electromagnetic waves in the middle and far infrared bands substantially monotonically decreases to 8 μm, but increases up to approximately 25 to 30% at wavelengths of approximately from 9 to 10 μm. Thus, substantially similarly to the description of NPL 1, even when emissivity correction is performed in the wavelength measurement band (from 8 to 15 μm) of the conventional radiation thermometer, a disturbance component due to the reflectance becomes too large to be ignored. Accordingly, the detection wavelength band of the infrared sensor 1 is 8μ or less, and does not include from 9 to 10 μm.

Specifically, in calculation and experiment performed by using reflectance measurement results illustrated in FIG. 10, if glass at 25° C. includes a reflected component of an object at 50° C., the temperature of the glass will be measured to be approximately 30° C., although it is originally 25° C., in the conventional band.

On the other hand, applying the method of the present embodiment using the reflective polarizing plate 2 can remove disturbance due to the reflectance, so that the temperature of the glass is measured to be 25° C. This is substantially the same even when temperature conditions vary, and in any case, the surface temperature of an object having reflection typified by glass can be accurately measured.

As described hereinabove, according to the radiation temperature measuring device according to the present embodiment, it is possible to detect at a sufficiently high level of output even in an infrared wavelength band optimum for measuring radiation temperature, and it is also possible to prevent incidence of an electromagnetic wave reflected by the measurement target to the infrared sensor by the reflective polarizing plate, thus enabling prevention of reduction in the accuracy of temperature measurement due to the electromagnetic wave.

REFERENCE SIGNS LIST

1: Infrared sensor
2: Reflective polarizing plate
3: Housing
4: Temperature converting unit
21: Grid
23: Film surface
100: Radiation temperature measuring device
101: Temperature measurement target

The invention claimed is:

1. A radiation temperature measuring device configured to contactlessly measure a surface temperature of an object by using an infrared sensor, the radiation temperature measuring device comprising:
the infrared sensor configured to detect an electromagnetic wave radiated from the object, the object including silicon oxide as a main component; and
a wire grid polarizing plate configured to reflect a polarized wave of one direction in the electromagnetic wave and transmit or absorb a polarized wave of a direction perpendicular to the one direction,
wherein the infrared sensor detects a p-polarized wave radiated from the object as the polarized wave of the one direction reflected by a grid side of the wire grid polarizing plate.

2. The radiation temperature measuring device according to claim 1, wherein the wire grid polarizing plate has a film shape, and has an axis such that a direction of the reflected polarized wave does not change even when the wire grid polarizing plate is rotated.

3. The radiation temperature measuring device according to claim 1, wherein the wire grid polarizing plate is oriented in a direction in which the wire grid polarizing plate is rotated around the direction of the reflected polarized wave on the wire grid polarizing plate, as a rotation axis.

4. The radiation temperature measuring device according to claim 3, wherein a reflection angle of the wire grid polarizing plate is set such that a reflectance in a perpendicular direction of the wire grid polarizing plate is a minimum.

5. The radiation temperature measuring device according to claim 3, wherein the wire grid polarizing plate has a polarization reflectance of 90% or more.

6. The radiation temperature measuring device according to claim 1, wherein the infrared sensor detects the electromagnetic wave radiated from the object including silicon oxide as the main component.

7. The radiation temperature measuring device according to claim 1, wherein the object has a flat surface, and a detection direction by the infrared sensor and the wire grid polarizing plate is different from a normal direction of a flat surface of the object.

8. The radiation temperature measuring device according to claim 6, wherein the infrared sensor has a detection wavelength band of 8 μm or less.

9. The radiation temperature measuring device according to claim 1, wherein the surface temperature of the object is determined based solely on the p-polarized wave radiated from the object as the polarized wave of the one direction reflected by the wire grid polarizing plate that is detected by the infrared sensor.

* * * * *